Figure 1:
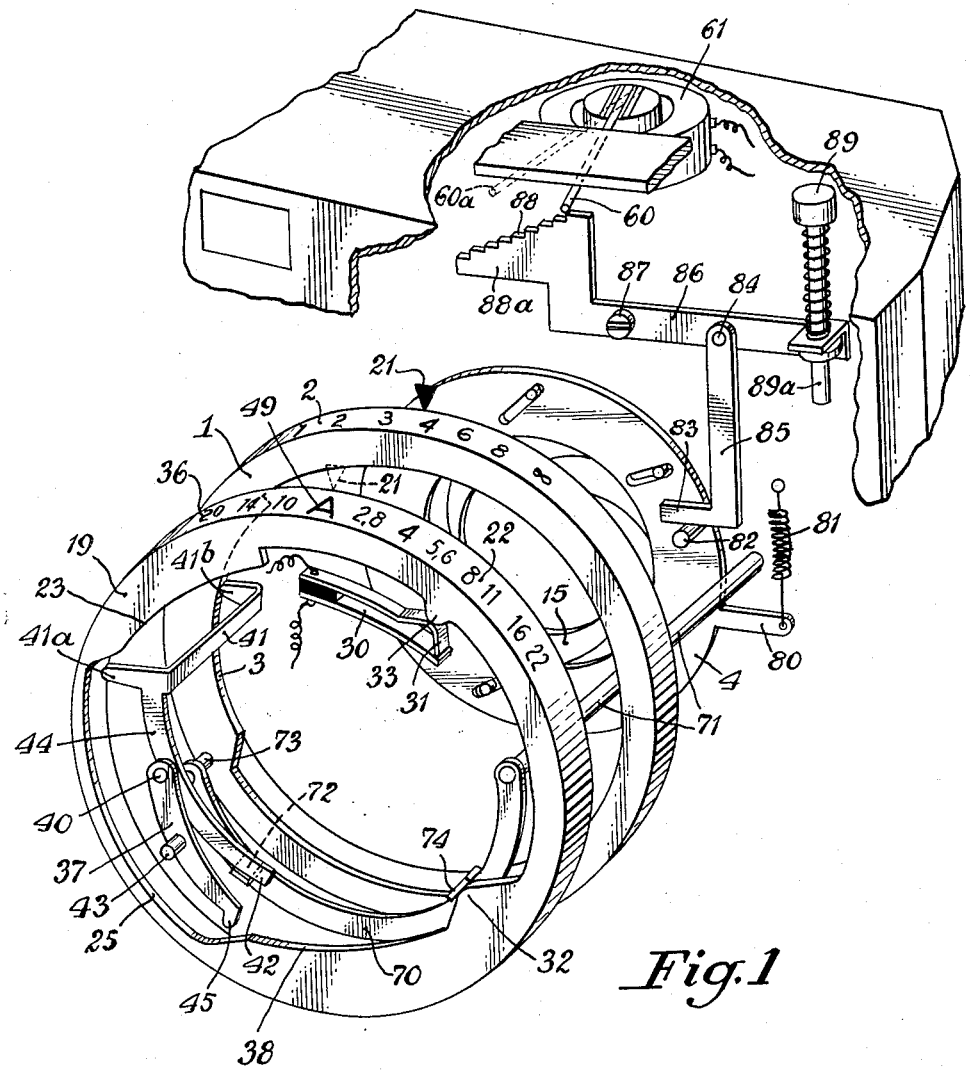

Jan. 21, 1964

E. SAUER ETAL 3,118,356

PHOTOGRAPHIC CAMERA WITH AUTOMATIC
FLASH EXPOSURE MECHANISM

Filed Aug. 15, 1962

2 Sheets-Sheet 1

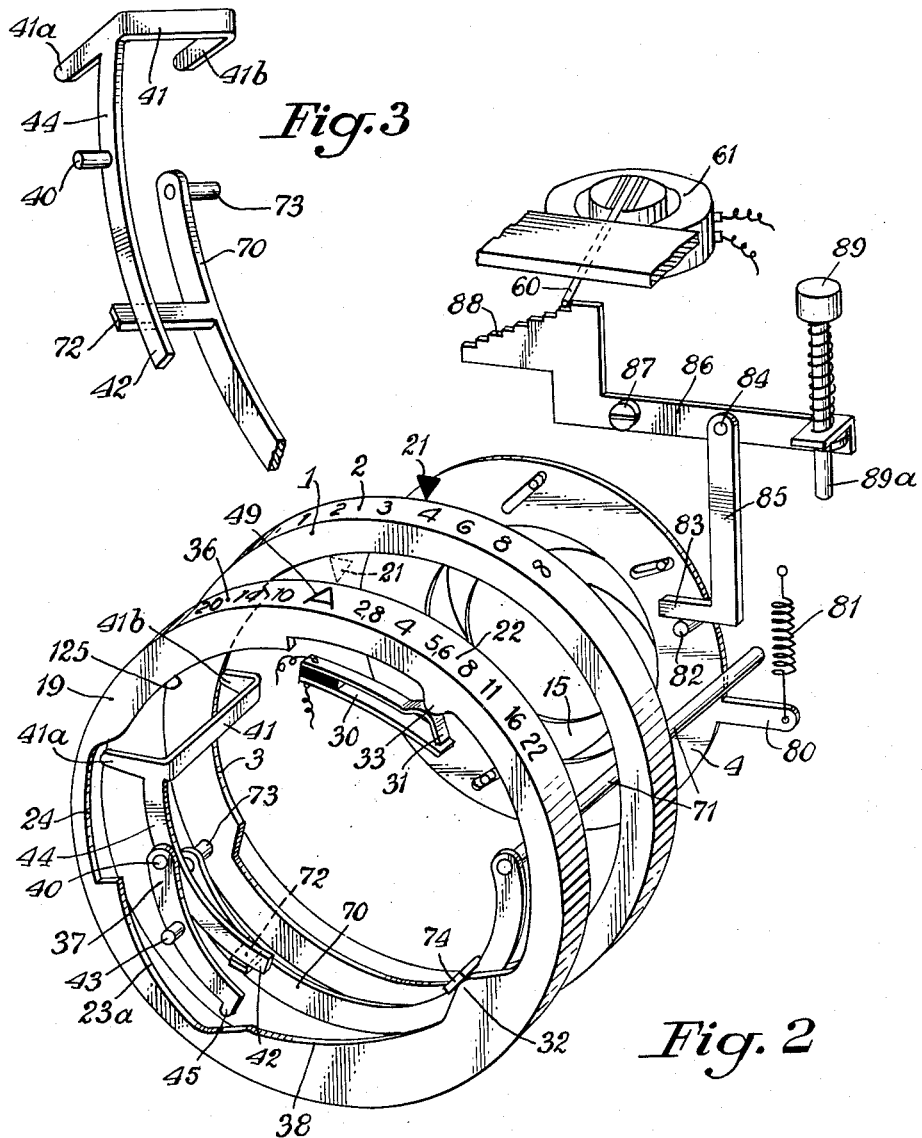

United States Patent Office 3,118,356
Patented Jan. 21, 1964

3,118,356
PHOTOGRAPHIC CAMERA WITH AUTOMATIC
FLASH EXPOSURE MECHANISM
Edgar Sauer, Johann Hahn, and Karl Joos, Stuttgart, Germany, assignors to Zeiss Ikon Aktiengesellschaft, Stuttgart, Germany
Filed Aug. 15, 1962, Ser. No. 217,045
Claims priority, application Germany Aug. 17, 1961
22 Claims. (Cl. 95—10)

This invention relates to photographic devices, such as cameras, objectives and shutters, which are provided with a number of operating ranges, such as a flash bulb exposure range, an operating range permitting a manual adjustment of the diaphragm and/or a preselection of the diaphragm aperture, and, if desired, an automatic exposure control mechanism, whereby for the purpose of facilitating the use of the camera the latter is also provided with an automatic flash exposure mechanism. This automatic flash exposure mechanism in combination with any desired guide number and distance value produces automatically the required diaphragm aperture without necessitating any calculations or reflections of the camera user. The automatic formation of the required diaphragm aperture and therewith a correct exposure of the film in the camera will take place in accordance with the equation diaphragm = guide number : distance The present invention is particularly directed to improvements of the photographic devices which are disclosed in the assignee's pending patent applications U.S. Serial No. 132,663, now Patent No. 3,074,331, filed August 21, 1961, and U.S. Serial No. 150,354, filed November 6, 1961, inventor Heinz Köppen. These prior devices are equipped in the same manner as the photographic devices of the present invention with an actuating ring which extends concentrically about the optical axis of the camera objective and is provided on its circumference with a number of scales indicating different operating ranges to which the photographic device may be selectively adjusted. This actuating ring is provided on one portion of its circumference with a guide number scale indicating the range within which automatically adjusted flash exposures can be made. Another portion of the circumference of this actuating ring is provided with a diaphragm scale which indicates the manual adjustment of the diaphragm aperture and, finally, there is provided on the ring a single mark which indicates the adjustment of the camera to an automatic exposure mechanism. Any one of these three ranges may be selectively used upon a rotatable adjustment of the actuating ring relatively to a single index arranged in a fixed position either on the mount of the camera objective or on the camera body. This actuating ring which is employed in the copending applications of the assignee is provided with a number of control cams which cause the deflection of pivotally mounted levers or the like. These levers in turn transmit a predetermined movement to the diaphragm adjusting mechanism so that the diaphragm is adjusted automatically to the proper aperture or manually to any desired aperture depending upon what operating range the actuating ring has adjusted to its operative position.

In addition to this actuating ring the photographic devices in said copending applications are also provided with a distance adjusting ring adapted to adjust the diaphragm by means of a cam controlled lever or the like, when the photographic device is adjusted for automatic flash bulb operation.

It is an object of the present invention to improve and simplify the mechanisms by which the adjustments of said actuating ring and said distance adjusting ring are transferred to the diaphragm adjusting mechanism. To this end the present invention provides a reduced number of intermediate pivoted levers or the like, which are not only used for adjusting the diaphragm when the automatic flash exposure mechanism is used but which also perform a manual adjustment of the diaphragm.

With these and other objects in view, the invention will now be described in greater detail with reference to the accompanying drawings which illustrate two different embodiments of the invention.

In the drawings:
FIG. 1 illustrates diagrammatically and in an expanded perspective view an automatic flash exposure mechanism and an automatic exposure mechanism arranged forwardly of the camera front wall. The manual adjustment of the diaphragm is also indicated;
FIG. 2 illustrates in a similar view as FIG. 1 a somewhat modified construction of the invention, and
FIG. 3 illustrates in detail a coupling connection between a cam operated lever and a diaphragm adjusting lever.

Referring to FIG. 1, a distance adjusting ring 1 which extends concentrically about the optical axis of the camera objective is provided on its outer circumference with a distance scale 2. On the inner circumference of this distance adjusting ring 1 is arranged a distance control cam 3 which is engaged by a scanning mechanism still to be described when the range of the automatic flash exposure mechanism is adjusted to its operative position. This cam 3 will transmit to the diaphragm mechanism a predetermined adjusting movement.

The actuating ring 19, which is arranged in this particular embodiment in front of the distance adjusting ring 1, is provided on its outer circumference with a guide number scale 36, a mark 49, namely A, and a diaphragm scale 22. The guide number scale 36 indicates the range of the flash bulb operating mechanism, the mark 49 indicates the operative position of the automatic exposure adjusting mechanism and the diaphragm scale 22 is used for the purpose of manually adjusting the diaphragm to the desired aperture. The inner circumference of the actuating ring 19 is provided with a deflecting or control cam, a guide cam, a disconnecting cam and a connecting cam. The deflecting or control cam 23 is associated with the manual diaphragm adjusting range (scale 22). Next to the cam 23 is arranged a concentric guide cam 25 which, as its name implies, consists of a portion which extends concentrically about the optical axis of the camera objective. Then follows a control cam 38 which is associated with the guide number scale 36. Then follows a disconnecting cam 32 and thereafter a connecting cam or a connecting nose 33. The two rings 1 and 19 are arranged in axial direction one next to the other so that the values on the scales of the mark A may be read off on a fixed index 21 which is common to all of the scales. When any one of the values of the guide number scale 36 has been adjusted to a position opposite the index 21, which is either arranged on the camera casing or on a stationary part of the objective mount, then the camera has been adjusted for taking flash exposures. When the mark A is moved opposite the fixed index 21, then the camera operates with the automatic exposure mechanism. When, however, a value of the diaphragm scale 22 has been adjustd to a position opposite the index 21, then the camera operates with a manual adjustment of the diaphragm.

The control cam 23 for the manual adjustment of the diaphragm is so shaped that when smaller diaphragm values on the scale 22 are moved in alignment with the index 21, the cam projects farthest away from the optical axis. If, for instance, the cam 23 indicates a diaphragm value f:2.8, the cam has its lowest rise, but when the diaphragm aperture f:22 is adjusted, then the cam 23 extends closest toward the optical axis.

The control cam 38 associated with the guide number scale 36 is so constructed that when the camera has been adjusted to higher guide numbers, the cam projects farthest toward the optical axis. The importance of the concentric portion or cam 25 and the inwardly projecting cams 32 and 33 will be described below in connection with the scanning elements and the disconnecting contact device 30, 31.

The above described deflecting or control cams are engaged by certain elements, particularly by pivotally mounted levers. A distance scanning lever 44 cooperates not only with the distance control cam 3 on the distance adjusting ring 1, but in accordance with the invention cooperates also with the cam 23 on the actuating ring 19. The cam 23 controls the manual adjustment of the diaphragm. This distance scanning lever 44 in accordance with the present invention is constructed at its upper end in the form of a fork. The lever 44 does not necessarily have to have this fork configuration but may also be provided with a single bent portion forming a scanning nose or the like so that the lever 44 engages one after the other the mentioned cams 3 and 23 on the rings 1 and 19, respectively. In the illustrated fork shape the lever 44 is provided at its upper end with two transversely spaced scanning portions 41a and 41b which are connected with each other by an axially extending transverse portion 41. The scanning portion 41b engages the distance control cam 3, while the scanning portion 41a is so arranged and constructed that it engages the cam 23 which controls the manual diaphragm adjusting ring.

The scanning lever 44 has in its longitudinal direction such a shape that it follows the curve of the adjusting rings 1 and 19 and, so to speak, extends concentrically about the optical axis so that the light entering the camera objective does not strike the lever 44. The lower end 42 of the lever 44 is constructed as power transmitting element or as a coupling element with respect to a lengthwise curved lever 70 which effects an adjustment of the diaphragm. For this purpose the lower end 42 of the lever 44 is in coupling engagement with a coupling projection 72 of the lever 70 so that the lever 44 is able to transmit its control and scanning movements to the lever 70. The lever 70 carries on its upper end a transversely extending control rod 71, which extends substantially parallel to the optical axis, and cooperates with a radial arm 80 extending outwardly from the rotatable diaphragm cage 4 of the diaphragm, the adjustable segments of which are designated with 15.

The pivotally mounted distance scanning lever 44 is, however, not rotatable about a stationary axis. Its axis of rotation 40 is carried by the upper end of a scanning lever 37 which in turn is rotatably mounted between its ends about a stationary pin 43. The scanning lever 37 is provided for the purpose of slidably engaging with its lower end the guide number cam 38 on the actuating ring 19 when the camera is adjusted for use of the automatic flash exposure mechanism. Therefore, the distance scanning lever 44 permits the transfer of its own deflections directly to the diaphragm adjusting lever 70, but the guide number adjusting lever 37 is forced to transfer its scanning movements by means of the lever 44 to the diaphragm adjusting mechanism.

The diaphragm adjusting lever 70 has a stationary axis of rotation 73. This lever 70 likewise is shaped in such a manner that it follows the curvature of the rings 1 and 19 so that also this lever will not dim the light which passes through the objective. The lever 70 is provided in addition to the already mentioned coupling projection 72 also with a lateral lug 74 which is in cooperation with the disconnecting cam 32. In the illustrated position, in which the lug 74 engages the cam 32, the diaphragm operating lever 70 is moved away from its operative position so far that it can not affect the diaphragm adjusting mechanism in any way. The control rod 71 projecting laterally from the lever 70 is placed in the illustrated position so far above the radial control arm 80 of the diaphragm cage 4 that any contact between these two elements is impossible. The diaphragm cage 4 with its segments 15 occupies according to the drawing a position which corresponds to the largest diaphragm aperture possible which in this case may be assumed as being f:2.8. A spring 81 seeks to pull the diaphragm cage 4 into this position or to hold it therein, respectively. The activities to which the diaphragm cage 4 is subjected in order to form a smaller diaphragm aperture can therefore take place only in one direction, namely where the diaphragm cage 4 is rotated clockwise.

In order to operate the diaphragm mechanism by the exposure meter or its scanning device, respectively, only in the range of the automatic exposure control mechanism, there is provided an interrupting contact device 30, 31 which is disposed in the electric circuit of the exposure meter. In the illustrated position the interrupting contact device 30, 31 is closed because it is engaged by the cam 33 on the ring 19. This means that in the operative position A of the automatic exposure mechanism according to the drawing the electric circuit of the exposure meter 60, 61 is closed so that upon depressing the release button 89 the scanning device 83—88 is able to work. This scanning device includes a two-armed lever 86 which is operated by the vertical shaft 89a of the release button 89 to rotate about its pivot axis 87. The lever 86 is provided at one end with an enlargement 88a having thereon a series of scanning steps 88 while on the other side of the pivot axis 87 an L-shaped link 85 is pivotally attached at 84 to the lever 86. This link 85 by means of its lower arm 83 engages a pin 82 arranged on the diaphragm cage 4 and the resulting downward movement of the link 85 will cause a closing of the diaphragm. The pointer 60 of the measuring instrument 61 is illustrated in its smallest deflection; the position of the largest deflection is indicated with 60a in dash lines. Before the pointer 60 is engaged by one of the steps 88, it is arrested by a clamping device in its deflected position so that any injury to this highly sensitive element 60 is avoided. The clamping device mentioned is not illustrated because in this purely diagrammatic illustration the construction details of the automatic exposure mechanism are irrelevant with respect to the present invention.

The mode of operation of the invention in the individual operating ranges is as follows:

In the operative position of the automatic exposure mechanism, which is illustrated in FIG. 1 because the mark A is opposite the index 21, the entire control mechanism for the automatic flash bulb exposure mechanism is ineffective for two reasons. Firstly, the distance scanning lever 44 whose scanning end 41b slides on the distance cam 3, works without a fixed fulcrum. As already stated, the axis of rotation of the distance scanning lever 44 is carried by the guide number scanning lever 37 which in turn pivots about the stationary pin 43. Since, however, the lower end 45 of the guide number scanning lever 37 moves in the void in this operative position of the automatic exposure mechanism, the end 41b of the lever 44 also moves in free air. Secondly, the diaphragm operating lever 70 is removed from the radial control arm 80 of the diaphragm cage 4 due to the engagement of the lug 74 with the projecting cam 32 so that the lever 70 also is ineffective.

Merely the movements of the scanning device 83—88 can be transferred to the diaphragm adjusting mechanism upon operating the release button 89. Due to the closing of the contact device 30, 31 the pointer 60 deflects and assumes a position according to the prevailing light on the subject to be photographed. If the deflection, as illustrated, is small according to the prevailing light conditions, the lever 86 can perform no or only a small movement before a step 88 engages the pointer 60. The pointer 60 engages either already the uppermost step of the series of steps 88 or it engages the second step from the top of the series of steps 88. The downward movement of the right lever end 86 and therewith of the link 85 pivotally attached thereto is so small that no or only a minute rotation of the diaphragm cage 4 in clockwise direction will take place. Hence, there is no or hardly any closing of the diaphragm segments 15.

If, however, due to a prevailing strong light the pointer 60 will be deflected to its full extent and assumes the position 60a, then the scanning device will only come to rest after the pointer 60 has come into engagement with the lowest step of the series of steps 88. This means that the right lever end 86 and therewith the link 85 will move the longest possible distance downwardly so that the segments 15 of the diaphragm close down to the smallest aperture possible.

When the camera is adjusted to the range of the automatic flash exposure mechanism, the actuating ring 19 is rotated clockwise so far that one of the guide numbers of the scale 36 is positioned opposite the index 21. During this rotation of the actuating ring 19 a number of functions will be exerted. The lower end 45 of the guide number scanning lever 37 will engage the guide number control cam 38 and the lever 37 is influenced to deflect in correspondence with the shape of this cam. This means that in the region of high guide numbers the levers 37 performs performs its largest deflection in counterclockwise direction and in the region of low guide numbers the lever 37 deflects counterclockwise to a smaller extent. The same is true for the upper end 41b of the distance scanning lever 44 which end cooperates with the distance control cam 3. If large distance values are adjusted, the lever 44 will deflect to its largest extent, and if small distance values are adjusted, it will deflect counterclockwise to its smallest extent.

The other functions involved with the movement of the actuating ring 19 into the operative position for the automatic flash exposure mechanism reside first in this that the diaphragm adjusting lever 70 is rendered operative due to the withdrawal of the lug 74 from the cam 32. Then the contact device 30, 31 is disengaged from the projection 33 and is thereby opened so that the measuring instrument 60, 61 is rendered inoperative. If in the range of the automatic flash exposure mechanism a high guide number is adjusted, the guide number scanning lever 37 with the axis 40 presses upon the distance scanning lever 44 which has its support at 41b. As a result, the lever 44 with its coupling end 42 presses upon the coupling projection 72 of the diaphragm adjusting lever 70 which thereby pivots about its stationary axis of rotation 73 in clockwise direction. Consequently, the control rod 71 engages the radial arm 80 of the diaphragm cage 4 and rotates the latter clockwise against the action of the spring 81. The diaphragm segments close accordingly. The same will happen when the distance adjusting ring 1 is adjusted to a small distance. The distance control cam 3, which protrudes strongly when small distance values have been adjusted, pivots the distance scanning lever 44 in clockwise direction. Its axis of rotation 40 is fixed because the guide number scanning lever 37 with its lower end 45 engages the cam 38. This has the result that the lower end 42 of the lever 44 again swings away, engages the coupling area 72 of the diaphragm adjusting lever 70 and pivots the latter in clockwise direction. Again, the control rod 71 engages the radial arm 80 of the diaphragm cage 4 and causes a corresponding closing of the diaphragm segments 15. If smaller guide numbers and larger distance values are adjusted, the diaphragm cage 4 accordingly is less affected, and medium values will produce an intermediate result.

Finally, if the photographic device is adjusted to make the range of the manual diaphragm operative, the counterclockwise rotation of the actuating ring 19 will have the following result:

The upper end 41a of the distance scanning lever 44 will engage the cam 23 which protrudes the more toward the optical axis the smaller the selected diaphragm aperture will be. This cam 23 as a unit extends so far toward the optical axis that the lever 44 will be moved a certain distance in clockwise direction. This has the result that the guide number scanning lever 37, which is connected with the lever 44 by means of the axis 40, is likewise pivoted in clockwise direction to such an extent that its lower end 45 engages the concentric cam 25. The guide number scanning lever 37 thus is supported with its free end 45 by an arc of uniform curvature and therefore, the axis 40 independent of the diaphragm adjusting movements is to be regarded as the fixed axis of rotation. The diaphragm adjusting lever 70 is in operative position because its lug 74 has moved beyond the projection 32. The contact device 30, 31 is opened.

If now progressively a smaller diaphragm aperture is adjusted, the distance scanning lever 44 pivots to a correspondingly increasing degree about the axis 40 in clockwise direction which causes a simultaneous deflection of the diaphragm adjusting lever 70 and a rotation of the diaphragm cage 4. Finally, if a diaphragm aperture of $f:22$ is adjusted, the elements will have been pivoted to the highest possible degree. An adjustment of the diaphragm mechanism by the upper end 41b of the lever 44 is not possible, since the cam 23 protrudes to such an extent that the end 41b remains out of engagement with the control cam 3. Therefore, in the range of the manual diaphragm adjustment a free selection of the distance can take place without any distance adjustment which could influence the formation of the diaphragm aperture.

The invention as illustrated in FIG. 1 makes it possible that the same scanning lever, namely the distance scanning lever 44, performs the desired operation in two different operating ranges. In the operating range of the automatic flash exposure mechanism the lever 44 by its upper end 41b takes care of the distance adjustment, and in the operating range of the manual diaphragm setting the end 41a of the lever 44 is engaged and deflected by the cam 23. Both deflections are transferred in time to the diaphragm adjusting lever 70 which in turn passes them on to the diaphragm mechanism.

The guide number scanning lever 37 also has two functions in this embodiment of the invention. In the range of the automatic flash exposure mechanism it engages the cam 38 associated with the adjusted guide numbers and then transfers these scanning deflections via the distance scanning lever 44 to the diaphragm adjusting lever 70. In the range of the manual diaphragm setting the guide number scanning lever 37 has the function to furnish the fixed axis of rotation 40 for the distance scanning lever 44 by the engagement of its lower end 45 with the concentric cam 25, whereby the lever 44 during this time feeds the manually adjusted diaphragm values to the diaphragm adjusting mechanism.

The embodiment of the invention illustrated in FIG. 2 differs from that illustrated in FIG. 1 primarily by the fact that the task of scanning the manual diaphragm values is not performed by the distance scanning lever 44 but is taken over by the guide number scanning lever 37. Consequently, there is no change in the mode of operation of the embodiment as shown in FIG. 2 in the operating ranges of the automatic flash exposure mechanism and of the automatic exposure mechanism. Particularly in the range of the automatic flash exposure mechanism the distance control cam 3 arranged on the distance adjustment ring 1 is still engaged by the upper end 41b of the lever 44, and the guide number control cam 38 arranged on the actuating ring 19 is still engaged by the lower end 45 of the guide number scanning lever 37. During this time the other end 41a of the lever 44 is opposite and in spaced relation from a concentric cam 24 which latter has no effect on this end 41a.

If, however, the operating range of the manual diaphragm selection is adjusted, then the end 41a of the lever 44 due to the counterclockwise rotation of the actuating ring 19 engages the elevated concentric cam 125 which has the result that the end 41b is lifted from the distance disconnecting cam 3 and the lower end 45 of the guide number scanning lever 37 is lowered onto the manual diaphragm cam 23a. Due to the fact that the end 41a is supported by the cam 125, the upward movements of the lever end 45 effect a more or less strong rotation of the distance scanning lever 44 in clockwise direction. The manual diaphragm cam 23a extends the more toward the optical axis, the smaller the diaphragm value is adjusted. If a diaphragm aperture of f:22 is adjusted, this cam 23a has reached its largest projection with respect to the periphery of the ring 19. This means that the lower end 45 of the lever 37 is raised toward the optical axis the more, the smaller the adjusted diaphragm aperture is. But also the other end of the lever 37 presses the more upon the axis 40 which has the effect that the coupling end 42 of the lever 44 swings outwardly and the diaphragm adjusting lever 70 rotates clockwise. The smaller the adjusted diaphragm aperture is, the more the control rod 71 presses upon the radial arm 80 of the diaphragm cage 4 and the more the diaphragm segments 15 are closed.

The most outstanding feature of the invention is the saving of a diaphragm scanning element or a similar control means for the range of the manual diaphragm adjustment. This function is always taken over by a scanning element which is needed anyway for one of the other operating ranges. Furthermore, the invention provides a great simplicity and a favorable arrangement of the individual parts. The points of engagement are located almost diametrical with respect to the transfer of the movements to the diaphragm mechanism and a disturbance of the light rays passing through the objective is prevented by the particular construction of the control levers which conform to the curvature of the actuating ring 19 and the distance adjusting ring 1, respectively.

What we claim is:

1. In a photographic camera designed for selectively making flash bulb exposures, automatically adjusted daylight exposures and independent adjustments of the diaphragm aperture, the combination of:
   (a) an adjustable diaphragm with means for adjusting the aperture of said diaphragm,
   (b) an automatic exposure adjusting mechanism including a measuring instrument,
   (c) a manually adjustable actuating ring (19) provided with a flash guide number scale, a diaphragm aperture scale and a single mark indicating an adjustment to said automatic exposure adjusting mechanism.
   (d) a manually adjustable distance adjusting ring (1) arranged adjacent said actuating ring and having a distance scale thereon,
   (e) cams on said actuating ring and on said distance adjusting ring and associated with said guide number scale, said diaphragm aperture scale, said distance scale and said single mark, respectively, and
   (f) means actuated by said cams for operating said diaphragm adjusting means by said actuating ring and distance adjusting ring depending upon which cams on these rings have been moved into operative position,
   (g) said means comprising pivotally mounted members (37, 44) engaged by the cams which control the operation of the diaphragm adjusting means when the guide number scale on said actuating ring is moved into operative position, and which also control in another operative position of said actuating ring the manual adjustment of said adjustable diaphragm.

2. In a photographic camera designed for selectively making flash bulb exposures, automatically adjusted daylight exposures and independent adjustments of the diaphragm aperture, the combination of:
   (a) an adjustable diaphragm with means for adjusting the aperture of said diaphragm,
   (b) an automatic exposure adjusting mechanism including a measuring instrument,
   (c) a manually adjustable actuating ring (19) provided with a flash guide number scale, a diaphragm aperture scale and a single mark indicating an adjustment to said automatic exposure adjusting mechanism,
   (d) a manually adjustable distance adjusting ring (1) arranged adjacent said actuating ring and having a distance scale thereon,
   (e) cams on said actuating ring and on said distance adjusting ring and associated with said guide number scale, said diaphragm aperture scale, said distance scale and said single mark, respectively, and
   (f) means actuated by said cams for operating said diaphragm adjusting means by said actuating ring and distance adjusting ring depending upon which cams on these rings have been moved into operative position,
   (g) said means including a pivotally mounted lever mechanism (44, 37) provided with scanning portions (41a, 45) engaging predetermined cams (3, 38), on said distance adjusting ring (1) and on said actuating ring (19), respectively, whereby said cams are effective to transfer the selected distance value and guide number value into said diaphragm adjusting mechanism,
   (h) said lever mechanism being also effective to transfer the manually selected diaphragm value into said diaphragm adjusting mechanism when the diaphragm scale (22) on said actuating ring is moved into operative position.

3. In a photographic camera designed for selectively making flash bulb exposures, automatically adjusted daylight exposures and independent adjustments of the diaphragm aperture, the combination of:
   (a) an adjustable diaphragm with means for adjusting the aperture of said diaphragm,
   (b) an automatic exposure adjusting mechanism including a measuring instrument,
   (c) a manually adjustable actuating ring (19) provided with a flash guide number scale, a diaphragm aperture scale and a single mark indicating an adjustment to said automatic exposure adjusting mechanism,
   (d) a manually adjustable distance adjusting ring (1) arranged adjacent said actuating ring and having a distance scale thereon,
   (e) cams on said actuating ring and on said distance adjusting ring and associated with said guide number scale, said diaphragm aperture scale, said distance scale and said single mark, respectively, and
   (f) means actuated by said cams for operating said diaphragm adjusting means by said actuating ring and distance adjusting ring depending upon which cams on these rings have been moved into operative position,
   (g) said means including a pivotally mounted lever mechanism (44, 37) provided with scanning portions (41a, 45) engaging predetermined cams (3, 38), on said distance adjusting ring (1) and on said actuating ring (19), respectively, whereby said cams are effective to transfer the selected distance value and guide number value into said diaphragm adjusting mechanism,
   (h) said lever mechanism being deflected by another one (23) of said cams on said actuating ring (19) to transfer a manually selected diaphragm value into said diaphragm adjusting mechanism when the diaphragm scale (22) on said actuating ring (19) is moved into operative position.

4. A photographic camera in accordance with claim 3, in which said lever mechanism includes a pivotally mounted lever (44) one end of which engages a cam (3) on said distance adjusting ring (1), while the same end of said lever engages a cam (23) on said actuating ring when the latter has been adjusted to make the diaphragm scale thereon operative.

5. A photographic camera in accordance with claim 3, in which said lever mechanism includes a pivotally mounted lever (44) one end of which engages a cam (3) on said distance adjusting ring (1), while the same end of said lever engages a cam (23) on said actuating ring when the latter has been adjusted to make the diaphragm scale thereon operative, and another lever (37) pivotally attached to said first mentioned lever and engaged by another cam (38) on said actuating ring to cause a deflection of said lever in accordance with the selected guide number when said flash bulb mechanism is in operative position.

6. A photographic camera in accordance with claim 3, in which said lever mechanism includes a pivotally mounted lever (44) one end of which engages a cam (3) on said distance adjusting ring (1), while the same end of said lever engages a cam (23) on said actuating ring when the latter has been adjusted to make the diaphragm scale thereon operative, and another lever (37) pivotally attached to said first mentioned lever and engaged by another cam (38) on said actuating ring to cause a deflection of said lever in accordance with the selected guide number, said other lever (37) engaging on said actuating ring a cam portion (25) concentrically arranged to the optical axis of the camera when said actuating ring has been adjusted to a position in which said diaphragm scale thereon is in operative position, whereby the point of said other lever (37) engaging said concentric cam portion (25) serves as fulcrum for said lever mechanism so that said other lever moves the first mentioned pivotally mounted lever (44) out of engagement with said cam (3) on said distance adjusting ring.

7. A photographic camera in accordance with claim 3, in which said lever mechanism includes a pivotally mounted lever (44) one end of which engages a cam (3) on said distance adjusting ring (1), while the same end of said lever engages a cam (23) on said actuating ring when the latter has been adjusted to make the diaphragm scale thereon operative, and another lever (37) pivotally attached to said first mentioned lever and engaged by another cam (38) on said actuating ring to cause a deflection of said lever in accordance with the selected guide number, said other lever (37) being arranged in such a manner relative to the guide number scale and the diaphragm aperture scale and to the cams associated with these scales that when the guide number scale is in operative position said other lever transfers the adjusted guide number value to said diaphragm adjusting mechanism, while when said diaphragm aperture scale is in operative position said other lever transfers the adjusted diaphragm value to said diaphragm adjusting mechanism (FIG. 2).

8. A photographic camera in accordance with claim 3, in which said lever mechanism includes a pivotally mounted lever (44) one end of which engages a cam (3) on said distance adjusting ring (1), while the same end of said lever engages a cam (23) on said actuating ring when the latter has been adjusted to make the diaphragm scale thereon operative, said pivotally mounted lever (44) being arranged in such a manner that one of its ends forms a fulcrum on a cam portion (125) formed on said actuating ring concentrically to the optical axis of the camera, so that the cam (3) on said distance adjusting ring is rendered inoperative when the diaphragm aperture scale on the actuating ring is moved into its operative position (FIG. 2).

9. A photographic camera in accordance with claim 3, in which said lever mechanism includes a pivotally mounted lever (44) one end of which engages a cam (3) on said distance adjusting ring (1), while the same end of said lever engages a cam (23) on said actuating ring when the latter has been adjusted to make the diaphragm scale thereon operative, and another lever (37) pivotally attached to said first mentioned lever and engaged by another cam (38) on said actuating ring to cause a deflection of said lever in accordance with the selected guide number, said pivotally mounted lever (44) being arranged in such a manner that one of its ends forms a fulcrum on a cam portion (125) formed on said actuating ring concentrically to the optical axis of the camera, so that the cam (3) on said distance adjusting ring is rendered inoperative when the diaphragm aperture scale on the actuating ring is moved into its operative position (FIG. 2).

10. A photographic camera according to claim 4, in which said pivotally mounted lever is provided at one end with two transversely spaced scanning portions (41a, 41b) adapted to engage said distance transferring cam (3) on said distance adjusting ring (1) and said diaphragm aperture transferring cam (23) on said actuating ring (19), respectively.

11. A photographic camera in accordance with claim 3, in which said lever mechanism includes a pivotally mounted lever (44) one end of which engages a cam (3) on said distance adjusting ring (1), while the same end of said lever engages a cam (23) on said actuating ring when the latter has been adjusted to make the diaphragm scale thereon operative, and another lever (37) pivotally attached to said first mentioned lever and engaged by another cam (38) on said actuating ring to cause a deflection of said lever in accordance with the selected guide number, said pivotally mounted lever (44) being provided at one end with two transversely spaced scanning portions (41a, 41b) adapted to engage said distance transferring cam (3) on said distance adjusting ring (1) and said diaphragm aperture transferring cam (23) on said actuating ring (19), respectively.

12. A photographic camera according to claim 4, in which said pivotally mounted lever is provided at one end with two transversely spaced scanning portions (41a, 41b) adapted to engage said distance transferring cam (3) on said distance adjusting ring (1) and said diaphragm aperture transferring cam (23) on said actuating ring (19), respectively, said diaphragm aperture transferring cam projecting such a distance toward the optical axis of said camera that when one of said scanning portions of said pivotally mounted lever engages said cam the other scanning portion of said pivotally mounted lever is held out of engagement with said distance transferring cam on said distance adjusting ring (FIG. 1).

13. A photographic camera according to claim 4, in which said pivotally mounted lever is provided at one end with two transversely spaced scanning portions (41a, 41b) adapted to engage said distance transferring cam (3) on said distance adjusting ring (1) and said diaphragm aperture transferring cam (23) on said actuating ring (19), respectively, said actuating ring (19) being provided with a cam portion (125) extending concentrically about the optical axis of the camera, said cam portion being engaged by one (41a) of said scanning portions and the other scanning portion (41b) being arranged in spaced relation from said distance transferring cam on said distance adjusting ring when said diaphragm aperture scale is in operative position (FIG. 2).

14. A photographic camera according to claim 4, in which said pivotally mounted lever is provided at one end with two transversely spaced scanning portions (41a, 41b) adapted to engage said distance transferring cam (3) on said distance adjusting ring (1) and said diaphragm aperture transferring cam (23) on said actuating ring (19), respectively, the other end of said pivotally mounted lever (44) being operatively coupled with a pivotally supported member (70) which is operatively connected with a rotatably mounted diaphragm cage of said diaphragm.

15. A photographic camera according to claim 4, in which said pivotally mounted lever is provided at one end with two transversely spaced scanning portions (41a, 41b) adapted to engage said distance transferring cam (3) on said distance adjusting ring (1) and said diaphragm aperture transferring cam (23) on said actuating ring (19), respectively, the other end of said pivotally mounted lever (44) being operatively coupled with a pivotally supported member (70) which is operatively connected with a rotatably mounted diaphragm cage of said diaphragm, said two transversely spaced scanning portions of said pivotally mounted lever and the end of said pivotally supported member (70) which is operatively connected with said diaphragm cage being arranged on substantially diametrically opposed points of a circle extending concentrically around the optical axis of the camera.

16. A photographic camera according to claim 4, in which said pivotally mounted lever is provided at one end with two transversely spaced scanning portions (41a, 41b) adapted to engage said distance transferring cam (3) on said distance adjusting ring (1) and said diaphragm aperture transferring cam (23) on said actuating ring (19), respectively, the other end of said pivotally mounted lever (44) being operatively coupled with a pivotally supported member (70) which is operatively connected with a rotatably mounted diaphragm cage of said diaphragm, said pivotally mounted lever (44) and said pivotally supported member (70) being curved lengthwise to extend substantially concentrically about the optical axis of said camera and closely along the inner circumference of said actuating ring and said distance adjusting ring.

17. A photographic camera according to claim 4, in which said pivotally mounted lever is provided at one end with two transversely spaced scanning portions (41a, 41b) adapted to engage said distance transferring cam (3) on said distance adjusting ring (1) and said diaphragm aperture transferring cam (23) on said actuating ring (19), respectively, the other end of said pivotally mounted lever (44) being operatively coupled with a pivotally supported member (70) which is operatively connected with a rotatably mounted diaphragm cage of said diaphragm, said actuating ring being provided with a disconnecting cam for engaging said pivotally supported member to move the same out of operative connection with said diaphragm cage when the actuating ring has been adjusted to a position in which said automatic exposure mechanism is operative.

18. A photographic camera according to claim 4, in which said pivotally mounted lever is provided at one end with two transversely spaced scanning portions (41a, 41b) adapted to engage said distance transferring cam (3) on said distance adjusting ring (1) and said diaphragm aperture transferring cam (23) on said actuating ring (19), respectively, the other end of said pivotally mounted lever (44) being operatively coupled with a pivotally supported member (70) which is operatively connected with a rotatably mounted diaphragm cage of said diaphragm, said actuating ring being provided with a contact device closing cam controlling the circuit of an exposure meter and also with a disconnecting cam for engaging said pivotally supported member to move the same out of operative position with said diaphragm cage when the actuating ring has been adjusted to a position in which said automatic exposure mechanism is operative.

19. A photographic camera according to claim 4, in which said pivotally mounted lever is provided at one end with two transversely spaced scanning portions (41a, 41b) adapted to engage said distance transferring cam (3) on said distance adjusting ring (1) and said diaphragm aperture transferring cam (23) on said actuating ring (19), respectively, the other end of said pivotally mounted lever (44) being operatively coupled with a pivotally supported member (70) which is operatively connected with a rotatably mounted diaphragm cage of said diaphragm, said actuating ring being provided with a disconnecting cam for engaging said pivotally supported member to move the same out of operative connection with said diaphragm cage when the actuating ring has been adjusted to a position in which said automatic exposure mechanism is operative, and means on said adjustable diaphragm mechanism operated by said automatic exposure mechanism when the latter is in said operative position.

20. In a photographic camera designed for selectively making flash bulb exposures with automatic diaphragm adjustment and independent adjustments of the diaphragm aperture, the combination of:
 (a) an adjustable diaphragm with means for adjusting the aperture of said diaphragm,
 (b) a manually adjustable actuating ring provided with a guide number scale and a diaphragm aperture scale,
 (c) a manually adjustable distance adjusting ring arranged adjacent said actuating ring and having a distance scale thereon,
 (d) cams on said actuating ring and on said distance adjusting ring and associated with said guide number scale, said diaphragm aperture scale and said distance scale,
 (e) means actuated by said cams for operating said diaphragm adjusting means by said actuating ring and distance adjusting ring depending upon which cam on these rings has been moved into operative position,
 (f) said means comprising pivotally mounted members (37, 44) engaged by the cams which control the operation of the diaphragm adjusting means when the guide number scale on said actuating ring is moved into operative position, said pivotally mounted members also controlling the manual adjustment of said diaphragm.

21. In a photographic camera designed for selectively making flash bulb exposures with automatic diaphragm adjustment and independent adjustments of the diaphragm aperture, the combination of:
 (a) an adjustable diaphragm with means for adjusting the aperture of said diaphragm,
 (b) a manually adjustable actuating ring provided with a guide number scale and a diaphragm aperture scale,
 (c) a manually adjustable distance adjusting ring arranged adjacent said actuating ring and having a distance scale thereon,
 (d) cams on said actuating ring and on said distance adjusting ring and associated with said guide number scale, said diaphragm aperture scale and said distance scale,
 (e) means actuated by said cams for operating said diaphragm adjusting means by said actuating ring and distance adjusting ring depending upon which cam on these rings has been moved into operative position,
 (f) said means including a pivotally mounted level mechanism (44, 37) provided with scanning portions (41a, 45) engaging predetermined cams (3, 38) on said distance adjusting ring (1) and on said actuating ring (19), respectively, whereby said cams are effective to transfer the selected distance value and guide number value into said diaphragm adjusting mechanism,
 (g) said lever mechanism being also effective to transfer the manually selected diaphragm value into said diaphragm adjusting mechanism when the diaphragm scale (22) on said actuating ring is moved into operative position.

22. In a photographic camera designed for selectively making flash bulb exposures with automatic diaphragm adjustment and independent adjustments of the diaphragm aperture, the combination of:
 (a) an adjustable diaphragm with means for adjusting the aperture of said diaphragm,
 (b) a manually adjustable actuating ring provided with a guide number scale and a diaphragm aperture scale,
 (c) a manually adjustable distance adjusting ring arranged adjacent said actuating ring and having a distance scale thereon,
 (d) cams on said actuating ring and on said distance adjusting ring and associated with said guide number scale, said diaphragm aperture scale and said distance scale,
 (e) means actuated by said cams for operating said diaphragm adjusting means by said actuating ring and distance adjusting ring depending upon which cam on these rings has been moved into operative position,
 (f) said means including a pivotally mounted lever mechanism (44, 37) provided with scanning portions (41a, 45) engaging predetermined cams (3, 38) on said distance adjusting ring (1) and on said actuating ring (19), respectively, whereby said cams are effective to transfer the selected distance value and guide number value into said diaphragm adjusting mechanism,
 (g) said lever mechanism being deflected by another one (23) of said cams on said actuating ring (19) to transfer a manually selected diaphragm value into said diaphragm adjusting mechanism when the diaphragm scale (22) on said actuating ring (19) is moved into operative position.

References Cited in the file of this patent

UNITED STATES PATENTS

| | | |
|---|---|---|
| 3,029,718 | Rentschler | Apr. 17, 1962 |
| 3,068,769 | Sauer | Dec. 18, 1962 |
| 3,072,033 | Hahn | Jan. 8, 1963 |